United States Patent [19]

Dworak et al.

[11] Patent Number: 4,839,003
[45] Date of Patent: Jun. 13, 1989

[54] PROCESS FOR PRODUCING ALKALI HYDROXIDE, CHLORINE AND HYDROGEN BY THE ELECTROLYSIS OF AN AQUEOUS ALKALI CHLORIDE SOLUTION IN A MEMBRANE CELL

[75] Inventors: Rainer Dworak, Wiesbaden; Karl Lohrberg, Heusenstamm, both of Fed. Rep. of Germany

[73] Assignee: Metallgesellschaft Aktiengesellschaft, Frankfurt am Main, Fed. Rep. of Germany

[21] Appl. No.: 116,433

[22] Filed: Nov. 3, 1987

[30] Foreign Application Priority Data

Nov. 7, 1986 [DE] Fed. Rep. of Germany ....... 3637939

[51] Int. Cl.⁴ .......................... C25B 1/02; C25B 1/16; C25B 1/26
[52] U.S. Cl. ...................... 204/98; 204/128; 204/129
[58] Field of Search .......................... 204/98, 128, 129

[56] References Cited

U.S. PATENT DOCUMENTS 4,069,117  1/1978  Cooper ................................. 204/98
4,481,088  11/1984  Moore et al. ...................... 204/128
4,586,993  5/1986  O'Brien .............................. 204/128

FOREIGN PATENT DOCUMENTS 2816772  10/1978  Fed. Rep. of Germany.

OTHER PUBLICATIONS

Official Gazette, May 22, 1979, p. 1407.

Primary Examiner—John F. Niebling
Assistant Examiner—Kathryn Gorgos
Attorney, Agent, or Firm—Sprung Horn Kramer & Woods

[57] ABSTRACT

Alkali hydroxide, chlorine and hydrogen are produced from an aqueous alkali chloride solution by membrane electrolysis. A high-NaCl solid salt, which contains impurities, is dissolved in water in a salt dissolver. Precipitating chemicals are added to the salt solution to precipitate the impurities. The resulting mixture is fed to a thickener, from which precipitates and clarified raw brine are separately withdrawn. The clarified raw brine from the thickener is divided at a ratio between 2:1 and 20:1 into first and second partial streams. The larger first partial stream is mixed with the salt solution and the precipitating chemicals before entering the thickener and the resulting mixture is fed to the thickener. The second partial stream of the clarified raw brine is fed through a fine purifier to the electrolytic cell. Spent brine from the electrolytic cell is fed to the salt dissolver.

1 Claim, 1 Drawing Sheet

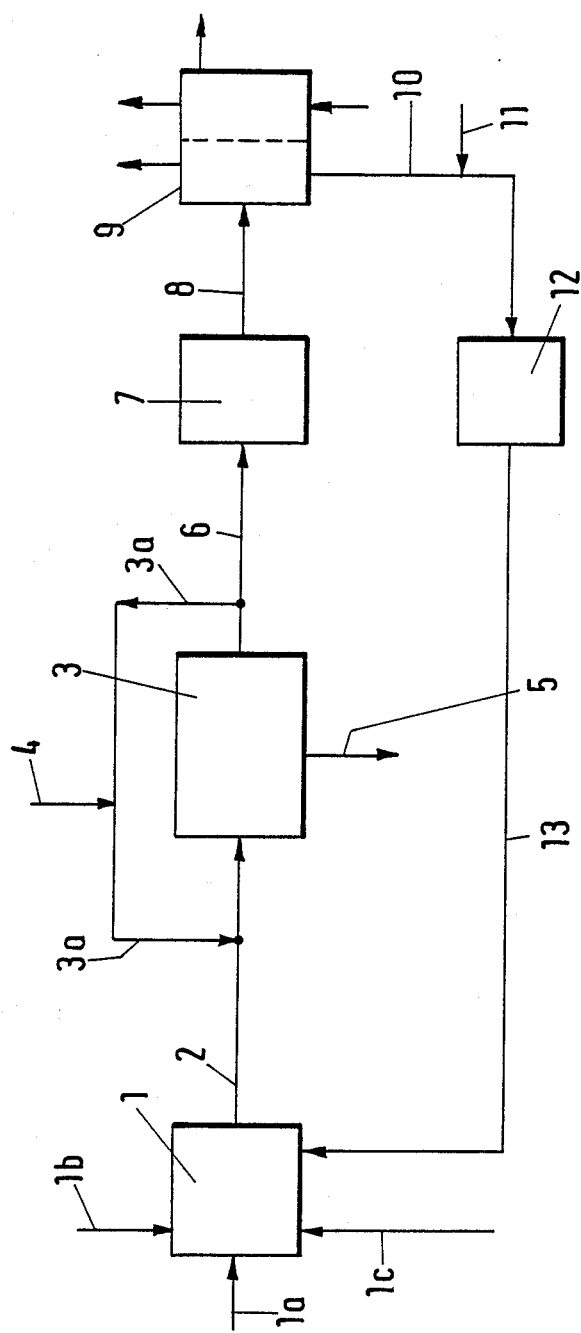

PROCESS FOR PRODUCING ALKALI HYDROXIDE, CHLORINE AND HYDROGEN BY THE ELECTROLYSIS OF AN AQUEOUS ALKALI CHLORIDE SOLUTION IN A MEMBRANE CELL

This invention relates to a process of producing alkali hydroxide, chlorine and hydrogen by the electrolysis of an aqueous alkali chloride solution in a membrane cell wherein a high-NaCl solid salt which contains impurities is dissolved in water in a salt dissolver, precipitating chemicals are added to the salt solution to precipitate the impurities, and the resulting mixture is fed to a thickener, from which precipitates and clarified raw brine are separately withdrawn, the raw brine is subjected to a fine purification, the finely purified brine is supplied to the membrane electrolytic cell, and spent brine is fed to the salt dissolver.

The electrolysis of alkali chloride solutions by the membrane process is known. In an electrolytic cell the anode and cathode chambers are separated by an ion exchange membrane. Purified brine containing about 26% sodium chloride is fed to the anode chamber. The anolyte being drained, the so-called dilute brine contains about 18% sodium chloride. Chlorine is formed at the anode as a reaction product. Water is supplied to the cathode chamber. Other reaction products consist of sodium hydroxide formed in the catholyte and hydrogen formed at the cathode. The electrolyte being drained is depleted of sodium chloride and must be withdrawn from the anode chamber but may be recycled to the anode chamber when the electrolyte has been dechlorinated, saturated and purified. When rock salt is used to saturate the dilute brine, the brine must be purified between the saturation plant and the electrolytic cell, i.e., in the anolyte cycle, and substantially all calcium and magnesium contained in the raw salt must be removed from the brine.

The process described first hereinbefore is known from Published German Application No. 28 16 772. In that process, the precipitates withdrawn from the thickener are recycled in part to the inlet of the thickener in order to enrich the mixture with seed crystals so as to promote the precipitation of $SiO_2$. In a known manner, the purified brine is fed through filters and ion exchangers to the anode chamber and is then electrolyzed. The anolyte being drained is dechlorinated and then fed to the salt dissolver.

It is an object of the invention to decrease in a simple manner the contents of magnesium ions and hydroxyl ions in the brine to be purified and, at the same time, to decrease the susceptibility of the circulating anolyte to fluctuations in the conditions of precipitation and generally to increase the economy of the membrane electrolysis. This is accomplished in accordance with the invention in that the clarified raw brine coming from the thickener is divided into first and second partial streams at a ratio between 2:1 and 10:1; the larger first partial stream is mixed with the salt solution and the precipitating chemicals before entering the thickener, the resulting mixture is fed to the thickener and the second partial stream is fed to the fine purifier.

The raw brine is purified by methods known per se. Usually, calcium in the form of the carbonate, magnesium and iron in the form of the hydroxides, and sulfate in the form of barium sulfate are precipitated from the raw brine. Because the precipitating chemicals, particularly barium salts, may be rather expensive, other known purifying methods may be adopted, in which lime or calcium chloride is used, or a precipitating process may be adopted in which lime and sodium carbonate, preferably sodium carbonate and sodium hydroxide, are employed.

The precipitated impurities are first separated in the thickener by sedimentation. The second partial stream of the clarified raw brine is then purified further by filtration so that the purified brine contains, as a rule, Mg not in excess of 0.5 to 1 mg/l and Ca not in excess of 2 to 3 mg/Ca whereas it contains about 300 to 320 g/l sodium chloride. The anolyte which is drained from the electrolytic cell is depleted in sodium chloride and contains about 160 to 240 g/l NaCl is dechlorinated and is then used to dissolve fresh (raw) salt.

The advantages afforded by the process in accordance with the invention reside in that owing to the previous precipitation of magnesium the hydroxyl ion concentration is low in the clarified raw brine and also in the pure brine obtained after the fine purification. The magnesium concentration of the anolyte is particularly low. Because the first partial stream of the clarified raw brine is large and because the Ca/Mg ratio is increased by an addition of calcium in the form of $CaCl_2$, CaO, $Ca(OH)_2$ or, if desired, $CaCO_3$, the magnesium and hydroxyl ion contents in the brine to be purified will be reduced, and the conditions of precipitation will be reduced.

The invention will be explained more in detail and by way of example with reference to the drawing which is a flow sheet of an illustrative embodiment of the process.

The example relates to a plant for producing about 15,000 kg sodium hydroxide per day by the electrolysis of an aqueous solution of sodium chloride in a membrane cell having an ion-selective membrane.

Water at a rate of 1 $m^3$/h is fed through line 1a to the salt dissolver 1, which is simultaneously supplied at its inlet 1b with solid rock salt at a rate of 1000 kg/h. In the rock salt fed at that rate, impurities at a rate of about 4 kg/h Ca($\approx$0.4%) and Mg at a rate of about 15 kg/h ($\approx$1.5%) are introduced. Calcium as a precipitating chemical consisting of $CaCl_2$, CaO or $Ca(OH)_2$ is fed through line 1c at the same time. A brine stream of about 6 $m^3$/h is withdrawn from the salt dissolver 1 through line 2. In that stream the Ca/Mg ratio is in excess of 1. The clarified raw brine from the thickener 3 is divided into first and second partial streams at a ratio between 2:1 and 20:1. The larger first partial stream is recycled in the recycle line 3a to the inlet of the thickener. The second partial stream of the clarified raw brine is withdrawn in line 6.

In the recycle line 3a, raw brine which contains 0.5 g/l Mg is now circulated at a rate of 30 $m^3$/h. Sodium hydroxide and sodium carbonate are now fed as a solution of about 10% through line 4 to that cycle. The calcium carbonate and magnesium hydroxide precipitates are withdrawn from the thickener 3 through line 5. Favorable conditions for the precipitation of magnesium are provided by a decrease of the magnesium ion concentration. In the process in accordance with the invention this is accomplished in that the same quantity is circulated in a larger volume. The addition of calcium results in a higher ratio of Ca to Mg and the higher Ca/Mg ratio will also improve the precipitation of magnesium.

The clarified raw brine in line 6 has a base content of 0.1 to 1 g/l NaOH and at a rate of 6 $m^3$/h is subjected to a fine purification in a system 7 comprising sand filters and ion exchangers. The resulting pure brine is fed through line 8 to the anode chamber of the membrane cell 9. The anolyte which is being drained through line 10 at a rate of 4.6 m$^3$/h has a pH value of about 4 to 5 and is adjusted with hydrochloric acid (through 11) to a pH value from 0 to 3 so that the formation of hypochlorite will be decreased. The drained anolyte is then supplied to the dechlorinator 12, in which a dechlorination is effected by a vacuum and/or by an injection of air. The dechlorinated thin brine is recycled through line 13 to the salt-dissolving station 1.

It will be understood that the specification and examples are illustrative but not limitative of the present invention and that other embodiments within the spirit and scope of the invention will suggest themselves to those skilled in the art.

What is claimed is:

1. A process for producing alkali hydroxide, chlorine and hydrogen by the electrolysis of an aqueous alkali chloride solution in a membrane electrolytic cell, comprising in a dissolver dissolving in water a high-NaCl solid salt which contains calcium and magnesium impurities to form a salt solution, adding precipitating chemicals to the salt solution to precipitate the impurities, feeding the resulting mixture to a thickener and separately withdrawing therefrom calcium and magnesium-containing precipitates and clarified raw brine, removing the withdrawn precipitates from the process, dividing the clarified raw brine withdrawn from the thickener into a first and a second partial stream at a ratio between 2:1 and 10:1, mixing the larger first partial stream with the salt solution and the precipitating chemicals before entering the thickener, feeding the resulting mixture to the thickener, subjecting the second partial stream to a fine purification, supplying to the membrane electrolytic cell the finely purified brine containing magnesium not in excess of 1 mg/l and calcium not in excess of 3 mg/l, and feeding spent brine from the cell to the salt dissolver.

* * * * *